United States Patent
Melton

(10) Patent No.: US 6,290,099 B1
(45) Date of Patent: Sep. 18, 2001

(54) PORTABLE, REMOVABLE ACCESSORY FOR A MATERIAL SPREADER

(76) Inventor: William S. Melton, Rte. 4 Box 280, Yazoo City, MS (US) 39194

( * ) Notice: Subject to any disclaimer, the term of this patent is extended or adjusted under 35 U.S.C. 154(b) by 0 days.

(21) Appl. No.: 09/511,484

(22) Filed: Feb. 23, 2000

(51) Int. Cl.$^7$ ..................................................... B67D 5/56
(52) U.S. Cl. ......................... 222/129; 220/528; 220/510; 239/302
(58) Field of Search .................................. 222/129, 132, 222/145.1, 181.1; 239/302, 303, 650, 553, 552, 553.3, 553.5, 590, 590.3, 590.5, 591; 220/528, 501, 510

(56) References Cited

U.S. PATENT DOCUMENTS

| | | | |
|---|---|---|---|
| 27,754 | * | 4/1860 | Williams ............................... 222/139 |
| 208,657 | * | 10/1878 | Williams ............................... 222/139 |
| 211,270 | * | 1/1879 | Sims et al. ........................... 222/139 |
| 224,909 | * | 2/1880 | Hill ..................................... 222/139 |
| 247,904 | * | 10/1881 | Griffin ................................. 222/139 |
| 416,498 | * | 12/1889 | Richardson ......................... 222/139 |
| 501,385 | * | 7/1893 | Turner ................................ 222/139 |
| 522,367 | * | 8/1894 | Gray ................................... 222/139 |
| 632,179 | * | 8/1899 | Floyd .................................. 222/139 |
| 690,354 | * | 12/1901 | Briscoe ............................... 222/139 |
| 3,463,360 | * | 8/1969 | Dorfman ............................. 222/139 |
| 4,093,101 | * | 6/1978 | Braun ................................. 220/22 |
| 4,609,151 | | 9/1986 | Crowley . |
| 4,872,589 | * | 10/1989 | Englehart et al. ................... 220/410 |
| 4,926,768 | | 5/1990 | Magda . |
| 5,288,017 | | 2/1994 | Halovitz . |
| 5,333,795 | | 8/1994 | Jessen . |
| 5,402,741 | | 4/1995 | Truax et al. . |
| 5,820,035 | | 10/1998 | Johnson et al. . |

FOREIGN PATENT DOCUMENTS

270698 A1 * 6/1988 (EP) ............................. B65D/25/04

* cited by examiner

Primary Examiner—Kevin Shaver
Assistant Examiner—Frederick C Nicolas
(74) Attorney, Agent, or Firm—Oliff & Berridge, PLC

(57) ABSTRACT

An accessory for a material spreader having a hopper. The accessory comprises a removable insert which constitutes a divider when placed in the hopper of the material spreader such that the hopper is divided into at least two compartments. In particular, the accessory may comprise a first removable panel and a second removable panel. In such case, the second removable panel is arranged to engage the first removable panel in a mutually perpendicular manner such that the first and second removable panels constitute a divider which divides the hopper of the material spreader into four compartments when placed in the hopper. The accessory is preferably molded of plastic material and may be provided with handle portion(s) and raised ribs.

20 Claims, 4 Drawing Sheets

PORTABLE, REMOVABLE ACCESSORY FOR A MATERIAL SPREADER

BACKGROUND OF THE INVENTION

1. Field of the Invention

The present invention relates to an accessory for a material spreader. More specifically, the present invention relates to an accessory which is designed to divide a hopper of the material spreader into two or more compartments and which is removable and portable.

2. Description of the Related Art

Material spreaders for applying everything from seeds and fertilizer to rock salt are well known in the art. Many different types of material spreaders are commercially available. Material spreaders may be designed to be towed or pushed, or may be self-propelled. In any case, known material spreaders comprise a hopper for receiving a material to be distributed and a mechanism for dispensing the material from the hopper.

Typical material spreaders have a hopper which defines only a single compartment. However, in many situations, it is desirable to spread multiple materials over the same area. For instance, seeds, fertilizer, pesticides, herbicides and other chemicals may be applied over an area such as a lawn. With a single-compartment hopper, this would disadvantageously require multiple passes over the same area, expending time and fuel, compacting the soil, and causing wear and tear on equipment. This is particularly true for hunters who wish to sow various seeds along with fertilizer to create food plots that attract deer.

For hunters, one solution is to purchase pre-mixed bags of seeds. Such pre-mixed bags, however, are rather expensive. Also, they typically do not include fertilizer which requires either self-mixing of fertilizer and seeds or at least one additional pass over the area. In the case of lawn care, not all areas may require the same fertilizers and chemicals or the same proportions thereof. Thus, pre-mixed bags of chemicals and/or fertilizers are typically not as effective or as cost efficient as separate applications.

These problems have been recognized in general by at least one person other than the inventor of the present invention. In U.S. Pat. No. 4,609,151 issued to Crowley, a material spreader having a hopper with multiple compartments is disclosed. While this material spreader provides a solution, the solution incurs several drawbacks.

In particular, the solution requires one to replace his spreader having a single-compartment hopper with a new spreader having the four-compartment hopper of Crowley. Especially in the agricultural industry, this may be cost-prohibitive even if one desires the benefits of the spreader disclosed by Crowley.

Further, use of a spreader with four compartments is disadvantageous when only a single material is to be dispensed. A user has to fill each individual compartment, requiring more time and greater accuracy. If only one or two of the compartments are filled on the same side, for example, the spreader may tend to tip over on that side during use or may be difficult to steer properly. Also, if all of the compartments are not filled to the same level, then the dispensing of material may be reduced as each of the compartments is emptied at different times, resulting in uneven application of the material. More refilling trips thus may be required to ensure that all four compartments contain material for dispensing.

A solution would be to have both a material spreader with a single-compartment hopper and a material spreader with a multi-compartment hopper at one's disposal. Again, this may be cost-prohibitive in some instances. Further, the storage space required for two spreaders may not be available or reasonable, depending on the circumstances.

Still further, the cost and difficulty of maintenance may be increased by a four-compartment hopper. Access to the dispensing mechanism to remove a clog, for example, may require complete removal of the hopper or disassembly of the mechanism itself.

SUMMARY OF THE INVENTION

It is therefore an object of the present invention to provide the advantages of a multi-compartment hopper without incurring the inherent disadvantages thereof.

Accordingly, the present invention aims to provide a portable, removable accessory for a material spreader which constitutes a divider when placed in a hopper of the material spreader. According to the invention, the accessory comprises a removable insert which divides the hopper into at least two compartments. The removable insert is preferably formed as a panel.

According to a preferred embodiment, the accessory comprises a first removable panel and a second removable panel. The second removable panel is arranged to engage the first removable panel in a mutually perpendicular manner such that the first and second removable panels constitute a divider which divides a hopper of a material spreader into four compartments when placed in the hopper.

According to a further preferred embodiment, the accessory includes a first central vertical slot extending from a top edge of the first removable panel and a second central vertical slot extending from a bottom edge of the second removable panel. The first central vertical slot is preferably dimensioned to receive a portion of the second removable panel and the second central vertical slot is preferably dimensioned to receive a portion of the first removable panel.

The portion of the first removable panel may comprise at least one recessed groove aligned with the first central vertical slot. Similarly, the portion of the second removable panel may comprise at least one recessed groove aligned with the second central vertical slot.

Preferably, however, the portion of the first removable panel comprises a recessed groove formed on each side of the first removable panel with the recessed grooves being aligned with the first central vertical slot. Similarly, the portion of the second removable panel preferably comprises a recessed groove formed on each side of the second removable panel with the recessed grooves being aligned with the second central vertical slot.

The accessory according to the present invention is preferably molded of plastic material.

Further, the accessory preferably has at least one handle portion. According to a preferred embodiment, the handle portion comprises an opening formed through a thickness of the panel.

Still further, the accessory preferably has a plurality of raised ribs on at least a portion of at least one surface thereof. The raised ribs are preferably arranged in parallel and oriented to run substantially vertical when the accessory is placed in the hopper. Even more preferably, the raised ribs are arranged to form channels which open at a bottom edge of the panel.

BRIEF DESCRIPTION OF THE DRAWINGS

The features and advantages of the present invention will become apparent from reading the following detailed description of the preferred embodiment, with reference to the drawings, in which.

DETAILED DESCRIPTION OF THE PREFERRED EMBODIMENT

Figure 2:
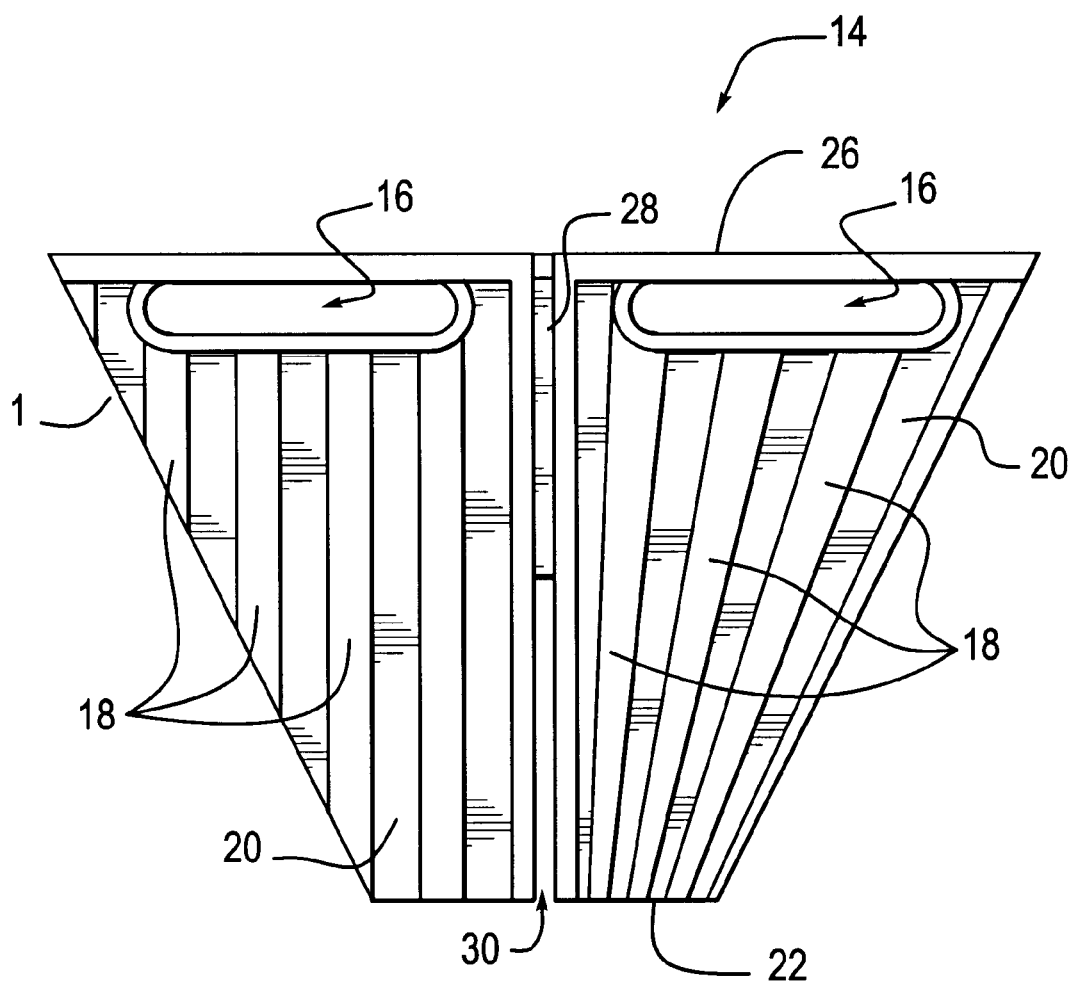
FIG. 2 shows a plan view of a second removable panel according to the preferred embodiment of the invention.
Figure 3:
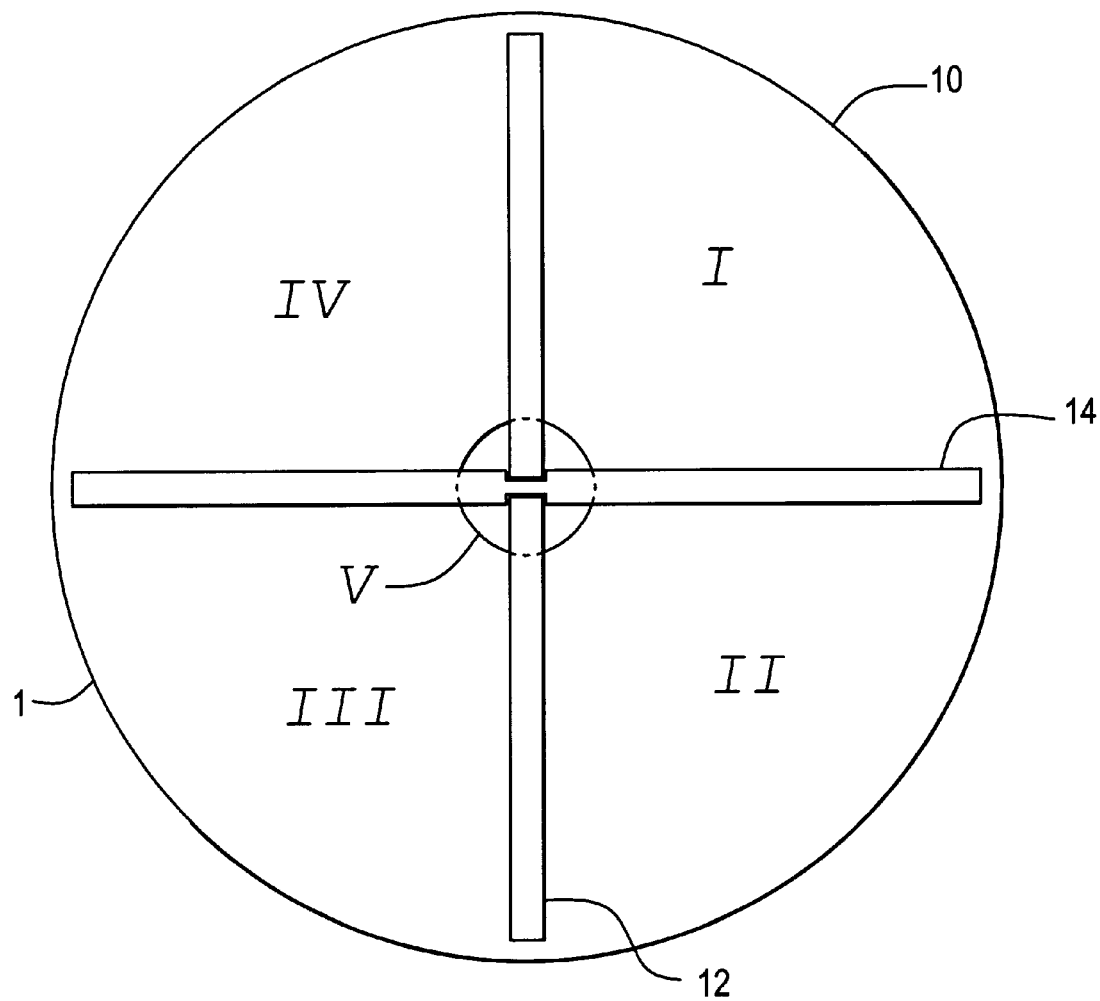
FIG. 3 shows a top view of the preferred embodiment of the invention in assembled form.
Figure 4:
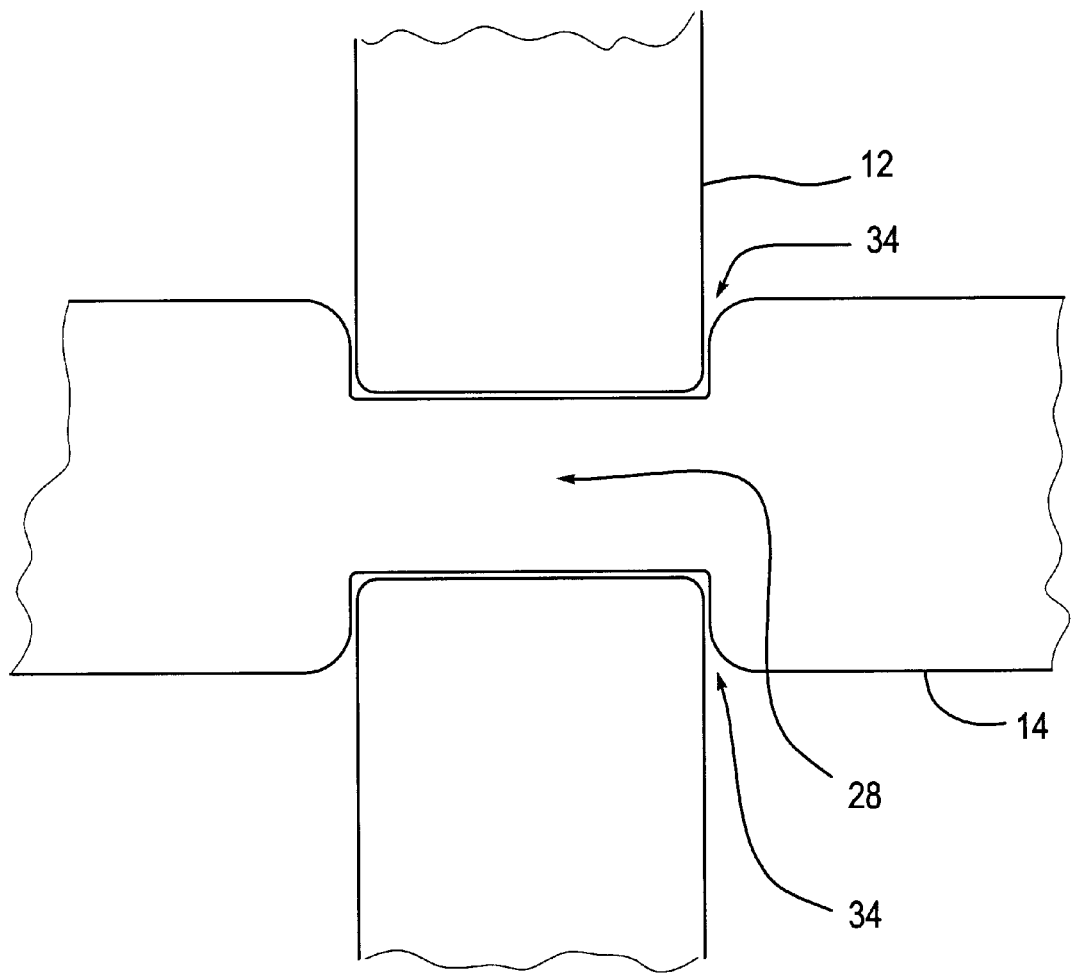
FIG. 4 shows an enlarged view of an area designated V in FIG. 3.

The preferred embodiment of the accessory 10 is shown assembled in FIG. 3. The accessory comprises a first removable panel 12, FIG. 1, and a second removable panel 14, FIG. 2. As illustrated, the second removable panel 14 is arranged to engage the first removable panel 12 in a mutually perpendicular manner. When the first and second removable panels 12, 14 are assembled and placed in a hopper 1 of a material spreader 2 (shown in FIG. 1), the accessory 10 constitutes a divider which divides the hopper I into four compartments, defined by the four quadrants 1, 11, 111 and IV shown in FIG. 3.

It has been noted that a majority of the commercially available material spreaders have hoppers of similar shape. Thus, the trapezoidal shape of the first and second removable panels 12, 14 shown in FIGS. 1 and 2, respectively, is preferred so that the accessory 10 will correspond with the internal dimensions of most hoppers. Of course, the first and second removable panels 12, 14 may be made in other shapes to be compatible with hoppers of other designs. According to the preferred embodiment shown, the first and second removable panels 12, 14 are especially adapted for use with either circular or square hoppers which taper downwardly toward a spreading mechanism of the material spreader.

It will be noted that in addition to varying the shape of the first and second removable panels 12,,14, the actual size thereof will vary depending upon the capacity of the hopper for which the accessory 10 will be used. Of course, this is merely a matter of scale and does not affect any of the novel features of the invention.

The first and second removable panels 12, 14 are preferably molded of plastic material. This provides relatively easy manufacture and enhanced durability.

According to the preferred embodiment, both the first removable panel 12 and the second removable panel 14 have at least one handle portion 16. Of course, it is possible to provide one or more handle portions 16 in only one of the panels. In that case, preferably at least the first removable panel 12 has at least one handle portion 16. While each handle portion 16 may comprise only an indentation, each handle portion 16 preferably comprises an opening formed through a thickness of the respective removable panel 12, 14.

The handle portions 16 facilitate carrying the accessory 10, either in assembled or disassembled form, assembling the first and second removable panels 12, 14 together, and moving the assembly 10 into/from a hopper. Also, the handle portions 16 provide convenient storage since the panels 12, 14 may be hung on hooks passing therethrough.

According to the preferred embodiment, the first and second removable panels 12, 14 each have a plurality of raised ribs 18 on at least a portion of at least one surface thereof. These raised ribs 18 provided added structural strength to the panels 12, 14 without an undue increase in weight. Preferably, the raised ribs 18 are arranged in parallel and oriented to run substantially vertical when the accessory 10 is placed in a hopper of a material spreader. This is illustrated on the left half of FIGS. 1 and 2.

Figure 1:
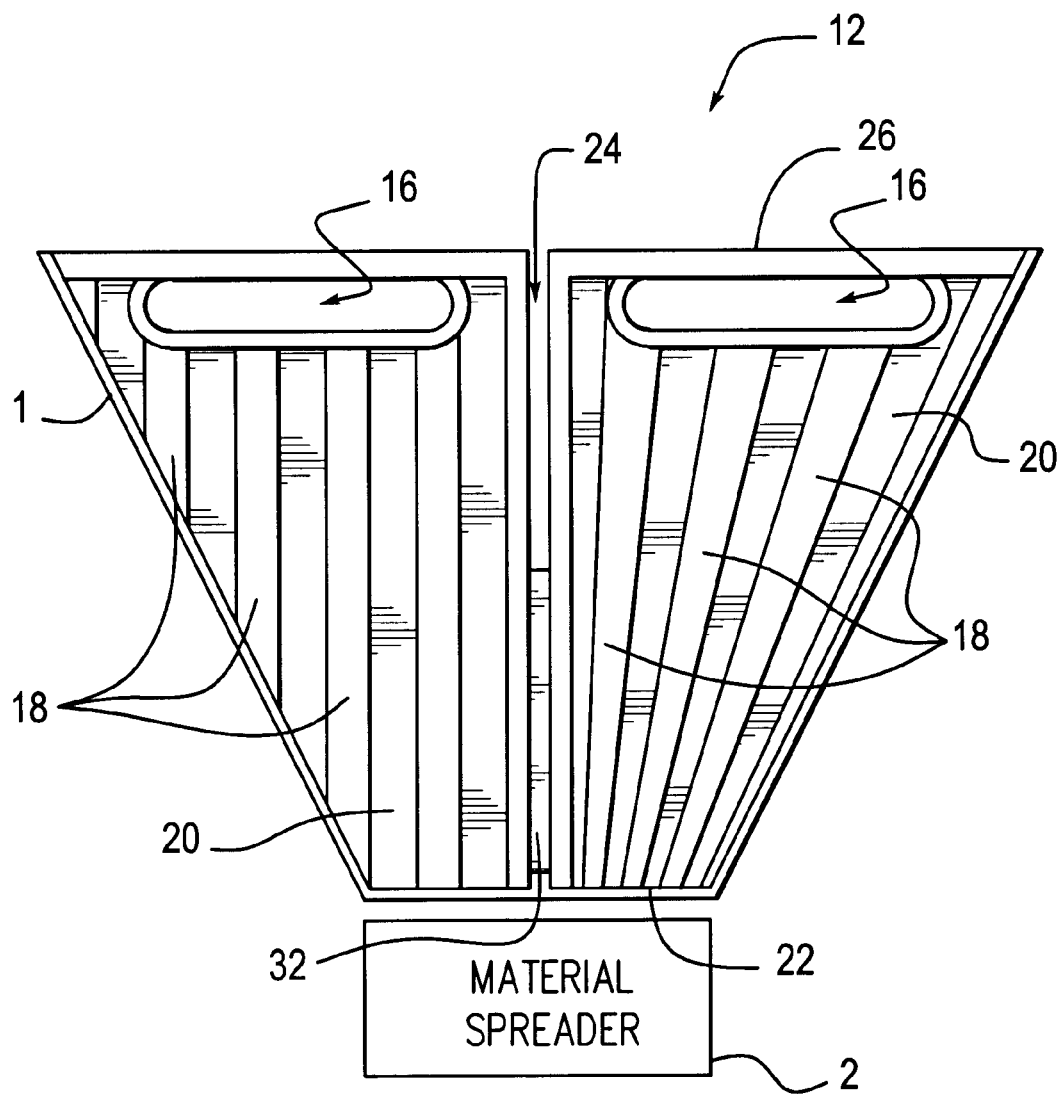
FIG. 1 shows a plan view of a first removable panel according to the preferred embodiment of the invention.

Alternatively, as illustrated on the right half of FIGS. 1 and 2, the raised ribs 18 may be arranged to form channels 20 which open at a bottom edge 22 of the respective panel 12, 14. This alternative provides the advantage that the material in the hopper coming into contact with the panels 12, 14 will not have the possibility of becoming lodged between the sides of the hopper and the channels 20 of the panels 12, 14. On the other hand, the raised ribs 18 will not be as structurally uniform.

As shown in FIG. 1, the first removable panel 12 includes a first central vertical slot 24 extending from a top edge 26 of the first removable panel 12. The first central vertical slot 24 is dimensioned to receive a portion 28 of the second removable panel 14. As shown in FIG. 2, the second removable panel 14 includes a second central vertical slot 30 extending from the bottom edge 22 of the second removable panel 14.

The second central vertical slot 30 is dimensioned to receive a portion 32 of the first removable panel 12. Thus, the first and second central vertical slots 24, 30 allow the mutually perpendicular engagement of the panels 12, 14 to form the accessory 10. Upon placement in a hopper, the accessory 10 is self-supporting and self-centering because of the mutually perpendicular engagement of the panels 12, 14.

According to the preferred embodiment, the respective portions 28, 32 of the panels 14, 12 each comprise at least one recessed groove 34 aligned with the respective central vertical slot 30, 24. Ideally, the portions 28, 32 each comprise a recessed groove 34 formed on each side of the respective panel 14, 12, the recessed grooves 34 again being aligned with the respective central vertical slot 30, 24. The grooves 34 provide added structural rigidity to prevent the panels 12, 14 from rotating relative to one another.

Although the invention has been described with reference to a preferred embodiment, it should be understood that various changes and modifications are possible without departing from the spirit or scope of the invention as defined in the claims that follow. In particular, it is contemplated that the accessory may comprise a removable insert of any kind which constitutes a divider when placed in a hopper of a material spreader such that the hopper is divided into at least two compartments. The removable insert may also be formed as a panel such that only a single panel may comprise the accessory.

In such a case, it would be advantageous to provide either permanent or removable guides along the inner sides of the hopper for the removable insert to slidingly engage. Such guides may be attached to the hopper in a semi-permanent mechanical manner, such as clamps or adhesive, or may be attached in a removable manner, such as magnetically if the hopper is made of a suitable metal. If the hopper is made of a suitable metal, however, it may not be necessary to include separate guides, but rather include a magnetic strip along each side edge of the insert which come into contact with the sides of the hopper.

Of course, although not set forth as preferred embodiments, the number and configuration of removable panels may be varied as needed.

I claim:

1. An accessory in combination with a material spreader having a hopper, the accessory comprising:

a removable insert which constitutes a divider when placed in a hopper of a material spreader such that the hopper is divided into at least two compartments, wherein the removable insert comprises at least one panel having a plurality of raised ribs on at least a portion of at least one surface thereof.

2. The accessory according to claim 1, wherein the raised ribs are arranged in parallel and oriented to run substantially vertical when the removable insert is placed in a hopper of a material spreader.

3. The accessory according to claim 1, wherein the raised ribs are arranged to form channels which open at a bottom edge of the panel.

4. The accessory according to claim 1, wherein the removable insert is molded of plastic material.

5. The accessory according to claim 1, wherein the removable insert comprises at least one panel having at least one handle portion.

6. The accessory according to claim 5, wherein the handle portion comprises an opening formed through a thickness of the panel.

7. An accessory in combination with a material spreader having a hopper, the accessory comprising:
a first removable panel; and
a second removable panel, the second removable panel being arranged to engage the first removable panel in a mutually perpendicular manner such that the first and second removable panels constitute a divider which divides the hopper of the material spreader into four compartments when placed in the hopper;
wherein at least one of the first and second removable panels has a plurality of raised ribs on at least a portion of at least one surface thereof.

8. The accessory according to claim 7, wherein the raised ribs are arranged in parallel and oriented to run substantially vertically when the removable panels are placed in the hopper of the material spreader.

9. The accessory according to claim 7, wherein the raised ribs are arranged to form channels which open at a bottom edge of the respective removable panel.

10. The accessory according to claim 7, wherein the removable insert is molded of plastic material.

11. The accessory according to claim 7, wherein the removable insert comprises at least one panel having at least one handle portion.

12. The accessory according to claim 7, wherein the handle portion comprises an opening formed through a thickness of the panel.

13. An accessory in combination with a material spreader having a hopper, the accessory comprising:
a first removable panel;
a first central vertical slot extending from a top edge of the first removable panel, the first central vertical slot being dimensioned to receive a portion of the second removable panel;
a second removable panel;
a second central vertical slot extending from a bottom edge of the first removable panel, the second central vertical slot being dimensioned to receive a portion of the first removable panel;
wherein the portion of at least one of the first removable panel and the second removable panel comprises at least one recessed groove aligned with the respective vertical slot; and
wherein the second removable panel is arranged to engage the first removable panel in a mutually perpendicular manner such that the first and second removable panels constitute a divider that divides the hopper of the material spreader into multiple compartments when placed in the hopper.

14. The accessory according to claim 13, wherein the portion of at least one of the first removable panel and the second removable panel comprises a recessed groove formed on each side of the respective panel, the recessed grooves being aligned with the respective vertical slot.

15. The accessory according to claim 13, wherein the removable insert is molded of plastic material.

16. The accessory according to claim 13, wherein the removable insert comprises at least one panel having at least one handle portion.

17. The accessory according to claim 16, wherein the handle portion comprises an opening formed through a thickness of the panel.

18. The accessory according to claim 14, wherein the removable insert is molded of plastic material.

19. The accessory according to claim 14, wherein the removable insert comprises at least one panel having at least one handle portion.

20. The accessory according to claim 19, wherein the handle portion comprises an opening formed through a thickness of the panel.

* * * * *